March 25, 1941. R. P. COSTELLO 2,236,492
BALL BEARING SCREW AND NUT PORTION
Filed Sept. 18, 1939

INVENTOR.
ROBERT P. COSTELLO.
David W. Gould
ATTORNEY.

Patented Mar. 25, 1941

2,236,492

UNITED STATES PATENT OFFICE 2,236,492

BALL BEARING SCREW AND NUT PORTION

Robert Patrick Costello, Calgary, Alberta, Canada

Application September 18, 1939, Serial No. 295,518

1 Claim. (Cl. 74—459)

This invention relates to a new article of manufacture comprising a ball bearing screw and nut portion, the nut portion adapted to have an integral or connected part or parts associated therewith, by which either the screw or the nut may be used for movement of an object, such as for example as the operative parts of a lifting jack and similar devices.

A further object is to provide a nut portion divided into substantially two equal parts vertically, the respective parts designed to interchangeably fit around a screw and enclose a set of ball bearings in operative relationship with the screw.

With the foregoing and other objects in view, as will appear as the description proceeds, the invention consists of the novel construction, combination and arrangement of co-operating elements as hereinafter more specifically set forth, claimed and shown in the accompanying drawing forming a part of the present application in which:

Like numerals of reference designate corresponding parts throughout the different views.

Figures 1, 2, 3:
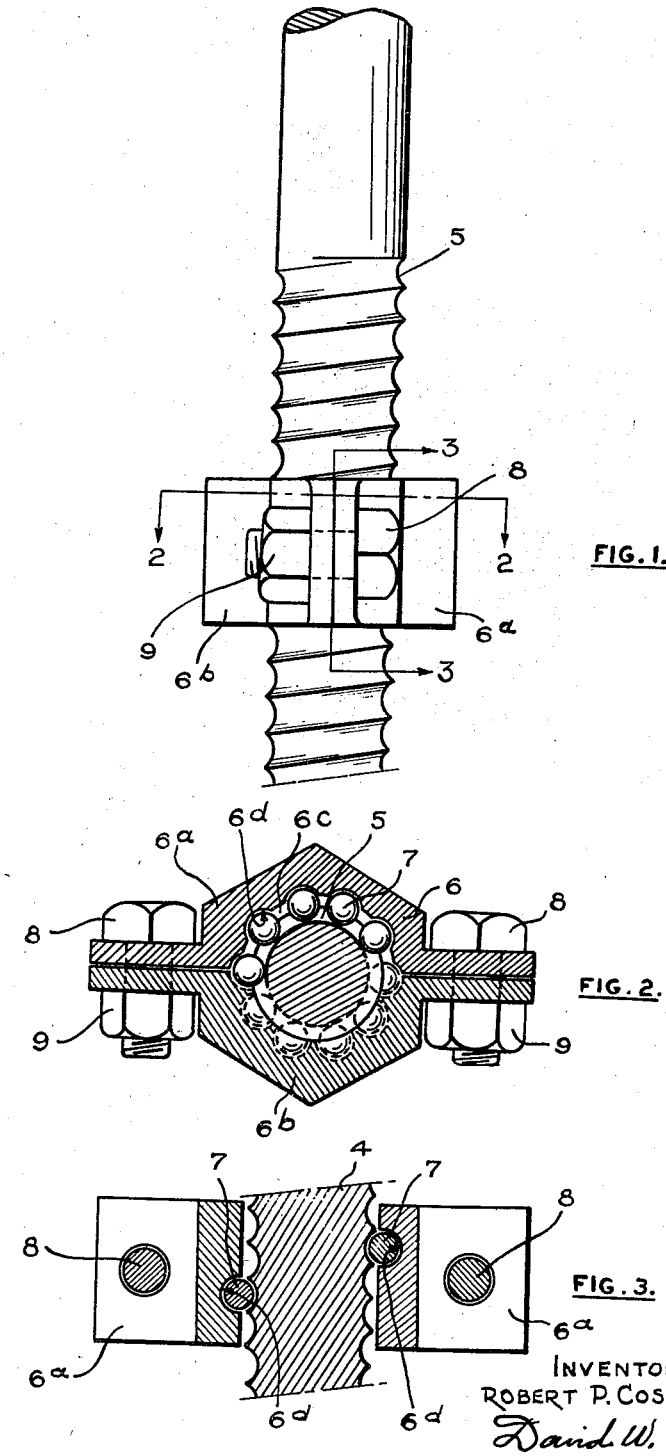
Fig. 1 is an elevation view of my invention, illustrating the ball bearing screw and nut portion embodying the principles of the present invention.
Fig. 2 is sectional view on the line 2—2 of Fig. 1.
Fig. 3 is a sectional view on the line 3—3 of Fig. 4.

4 is a screw, having a helical thread in the form of a concave groove as at 5. 6 is a nut portion composed of similarly made parts 6a and 6b, each having a groove 6c formed on its respective inner face and in such co-relations to each other as to provide one complete encirclement of the screw 4 to accommodate the ball bearings 7 in the opening formed by the groove 6c and that portion of the helical thread then present in the nut portion. Preferably, the ball bearing race or groove 6c is provided with a plurality of outwardly formed seats 6d in which the ball bearings 7 are partially seated and retained in predetermined spaced relationship. The respective parts 6a and 6b of the nut 6 may be securely connected together in any desired manner, such as by bolts 8 and nuts 9.

An important feature of this invention is that the parts 6a and 6b may be similarly manufactured and are interchangeable. The curved groove 6c in the part 6a is shown in Fig. 3 as in the upper half thereof. This part 6a may be turned upside down and used as a substitute for 6b. Thus, I provide a two-part nut portion in which the interchangeable parts are grooved, each having formed therein a similar one-half-encirclement helical thread adjacent one end of the body portion thereof and each of a corresponding pitch to that of the helical thread formed in the screw with which such nut is to be used.

In the disclosure of my invention, I have not shown any part or parts integrally or associated with the body parts of the nut portion 6, as I appreciate many different integrally formed or associated parts may be made each designed to make a complete article of manufacture for the particular use desired. For example, if my ball bearing screw and nut portion were to be used in the manufacture of lifting jacks, the nut portion 6 may have a spur or lug integrally formed or associated therewith, for convenient connection with the object to be lifted, the screw provided with any desired means of support and means for rotating either the screw or nut portion.

The foregoing specification and annexed drawing disclose the preferred embodiment of my invention, but it is to be understood that minor changes may be resorted to in the commercial adaptation of my invention without departing from the scope of the invention as hereinafter claimed.

What I claim as new is:

A screw and nut connection including a helically threaded screw and a nut cooperating therewith, said nut comprising separate identical and interchangeable portions formed with lateral flanges, bolts passing through said flanges to hold the portions in operative relation, said portions having a series of recesses extending in a single helical line from the edge of one flange to the edge of the other flange, and ball bearings seated and held in each of said recesses and having rolling contact with said helical threaded screw.

ROBERT PATRICK COSTELLO.